United States Patent
Zhao et al.

(10) Patent No.: US 12,323,968 B2
(45) Date of Patent: Jun. 3, 2025

(54) METHOD AND APPARATUS FOR DETERMINING SIDELINK FEEDBACK RESOURCE, AND TERMINAL AND STORAGE MEDIUM

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 376 days.

(21) Appl. No.: 17/728,699

(22) Filed: Apr. 25, 2022

(65) Prior Publication Data
US 2022/0248428 A1     Aug. 4, 2022

Related U.S. Application Data

(63) Continuation of application No. PCT/CN2019/116424, filed on Nov. 7, 2019.

(51) Int. Cl.
*H04W 72/20* (2023.01)
*H04W 72/121* (2023.01)
(Continued)

(52) U.S. Cl.
CPC ..... *H04W 72/1263* (2013.01); *H04W 72/121* (2013.01); *H04W 72/20* (2023.01); *H04W 92/18* (2013.01)

(58) Field of Classification Search
CPC ............. H04W 72/1263; H04W 72/20; H04W 72/121; H04W 92/18
See application file for complete search history.

(56) References Cited

U.S. PATENT DOCUMENTS

2017/0280469 A1    9/2017    Park et al.
2017/0347394 A1    11/2017   Yasukawa et al.
(Continued)

FOREIGN PATENT DOCUMENTS

CN    107079437 A    8/2017
CN    108322414 A    7/2018
(Continued)

OTHER PUBLICATIONS

International Search Report issued in corresponding International Application No. PCT/CN2019/116424, mailed Jul. 27, 2020, 31 pages.
(Continued)

*Primary Examiner* — Rafael Perez-Gutierrez
*Assistant Examiner* — Gilbert M Grant
(74) *Attorney, Agent, or Firm* — BAYES PLLC

(57) ABSTRACT

Disclosed are a method and apparatus for determining a sidelink feedback resource, and a terminal and a storage medium. The method includes: obtaining, by a first terminal, sidelink feedback resource configuration information, and determining a sidelink feedback resource set according to the sidelink feedback resource configuration information; obtaining, by the first terminal, a first parameter set; determining, by the first terminal, a sidelink feedback resource in the sidelink feedback resource set according to the first parameter set; and sending, by the first terminal, sidelink feedback information to a second terminal on the sidelink feedback resource.

9 Claims, 4 Drawing Sheets

(51) Int. Cl.
*H04W 72/1263* (2023.01)
*H04W 92/18* (2009.01)

(56) References Cited

U.S. PATENT DOCUMENTS

| | | | |
|---|---|---|---|
| 2019/0110325 A1 | 4/2019 | Gulati et al. | |
| 2020/0100215 A1* | 3/2020 | Li | H04L 5/0082 |
| 2021/0243841 A1* | 8/2021 | Yasukawa | H04W 28/04 |
| 2022/0240227 A1* | 7/2022 | Lee | H04W 72/20 |
| 2022/0303985 A1* | 9/2022 | Miao | H04W 72/0446 |
| 2023/0292318 A1* | 9/2023 | Hui | H04W 72/56 |
| 2023/0318757 A1* | 10/2023 | Lee | H04L 1/189 370/329 |

FOREIGN PATENT DOCUMENTS

| | | |
|---|---|---|
| CN | 108347313 A | 7/2018 |
| CN | 108631968 A | 10/2018 |
| EP | 4033832 B1 | 12/2023 |
| WO | 2016076301 A1 | 5/2016 |
| WO | 2018137452 A1 | 8/2018 |
| WO | 2018171563 A1 | 9/2018 |
| WO | 2019064983 A1 | 4/2019 |
| WO | 2019197025 A1 | 10/2019 |

OTHER PUBLICATIONS

PCT Written Opinion of the International Searching Authority issued in corresponding International Application No. PCT/CN2019/116424, mailed Jul. 27, 2020, 6 pages.
"Sidelink physical layer procedures for NR V2X", Agenda Item: 7.2.4.5, Source: Huawei, HiSilicon, 3GPP TSG RAN WG1 Meeting #98bis R1-1910059, Chongqing, China, Oct. 14, 20, 2019, 30 pages.
"Discussion on physical layer procedures for NR sidelink", Agenda Item: 7.2.4.5, Source: LG Electronics, 3GPP TSG RAN WG1 Meeting #98 bis, R1-1910783, Chongqing, China, Oct. 14-20, 2019, 23 pages.
"Physical Layer Procedures for Sidelink", Agenda item: 7.2.4.5, Source: Qualcomm Incorporated, 3GPP TSG RAN WG1 Meeting #98bis R1-1911110, Chongqing, China, Oct. 14-18, 2019, 8 pages.
"PHY layer procedures for NR sidelink", Agenda Item: 7.2.4.5, Source: Ericsson, 3GPP TSG, RAN WG1 Meeting #98bis, R1-1910538, Chongqing, China , Oct. 14-20, 2019, 13 pages.
"Support of NR Sidelink Unicast and Groupcast", Agenda Item: 7.2.4.1.1, Source: InterDigital Inc., 3GPP TSG RAN WG1 Meeting #94bis, R1-1811209, Chengdu, China, Oct. 8-12, 2018, 4 pages.
First Office Action issued in corresponding Chinese application No. 202210415786.8, mailed May 18, 2023.
First Office Action issued in corresponding Canadian application No. 3,157,609, mailed Jun. 14, 2023.
Second Office Action issued in corresponding Chinese application No. 202210415786.8, mailed Aug. 25, 2023.
First Office Action issued in corresponding Japanese application No. 2022-524721, mailed Sep. 19, 2023.
3GPP TSG-RAN WG2 Meeting #107 Prague, Czech, Aug. 26,-Aug. 30, 2019; R2-1908716 Source: OPPO; Title: Left issues on HARQ for NR-V2X.
Notice of Allowance issued in corresponding Chinese application No. 202210415786.8, mailed Jan. 4, 2024.
Notice of Allowance issued in corresponding Japanese application No. 2022-524721, mailed Feb. 6, 2024.
First Office Action issued in corresponding Indian application No. 202217024823, mailed Sep. 1, 2022.
Extended European Search Report issued in corresponding European application No. 19951295.5, mailed Nov. 8, 2022.
CMCC, "Discussion on HARQ feedback for NR V2X", R1-1910164, 3GPP TSG RAN WG1 #98bis Chongqing, China, Oct. 14-20, 2019.
Qualcomm Incorporated, "Physical layer procedures for sidelink", R1-1909257, 3GPP TSG RAN WG1 #98 Prague, CZ, Aug. 26-30, 2019.
Second Office Action issued in corresponding Canadian application No. 3,157,609, mailed Apr. 8, 2024.
First Office Action issued in corresponding Vietnamese Application No. 1-2022-03227, dated Aug. 30, 2024, 3 pages.
Examination report No. 1 for standard patent application issued in corresponding Australian Application No. 2019473666, mailed on Mar. 8, 2025, 3 pages.
Request for the Submission of an Opinion issued in corresponding Korean Application No. 10-2022-7015104, mailed on Mar. 18, 2025, 12 pages.

* cited by examiner

METHOD AND APPARATUS FOR DETERMINING SIDELINK FEEDBACK RESOURCE, AND TERMINAL AND STORAGE MEDIUM

CROSS-REFERENCE TO RELATED APPLICATION

This application is a continuation of International Application No. PCT/CN2019/116424, filed on Nov. 7, 2019, the contents of which is incorporated herein by reference in its entirety.

TECHNICAL FIELD

Embodiments of the present disclosure generally relate to the communication technical field, and more particularly, to a sidelink feedback resource determination method and device, a terminal, and a storage medium.

BACKGROUND

Device to Device (D2D) communication is a technology based on sidelink (SL) transmission. Different from the traditional cellular system in which communication data is received or sent through a base station, D2D communication has higher spectral efficiency and lower transmission delay. The Internet of Vehicles system adopts the method of device-to-device direct communication, and two transmission modes are defined in the 3rd Generation Partnership Project (3GPP): a first transmission mode and a second transmission mode.

In the first transmission mode, the transmission resources for terminals are allocated by a base station, and the terminals send data on the sidelink according to the resources allocated by the base station. The base station can allocate resources for a single transmission to the terminals, or can allocate semi-static transmission resources to the terminals. The transmission mode is also known as Mode 3 in Long Term Evaluation-Vehicle to Everything (LTE-V2X).

In the second transmission mode, a vehicle terminal selects a resource in a resource pool for data transmission. The transmission is also known as Mode 4 in LTE-V2X.

LTE-V2X supports broadcast transmission, and in New Radio-Vehicle to Everything (NR-V2X), unicast and groupcast transmissions are introduced. In NR-V2X, a sidelink feedback channel is introduced. One slot in every N slots includes a Physical Sidelink Feedback Channel (PSFCH) transmission resource. If frequency domain resources for transmitting the sidelink feedback channel are configured in the feedback slot, or a transmission resource set for the sidelink feedback channel is configured, how to determine the specific feedback resources in the set is a problem that needs to be solved.

SUMMARY

Embodiments of the present disclosure provide a sidelink feedback resource determination method and device, a terminal, and a storage medium.

According to a first aspect, there is provided a sidelink feedback resource determination method, including:
obtaining, by a first terminal, sidelink feedback resource configuration information, and determining a sidelink feedback resource set according to the sidelink feedback resource configuration information;
obtaining, by the first terminal, a first parameter set;
determining, by the first terminal, a sidelink feedback resource in the sidelink feedback resource set according to the first parameter set; and
sending, by the first terminal, sidelink feedback information to a second terminal on the sidelink feedback resource.

According to a second aspect, there is provided a terminal, including a memory, a processor, and a sidelink feedback resource determination program stored on the memory and runnable on the processor, wherein when the sidelink feedback resource determination program is executed by the processor, the processor is caused to perform steps in the sidelink feedback resource determination method described above.

According to a third aspect, there is provided a computer-readable storage medium having a sidelink feedback resource determination program stored thereon, wherein when the sidelink feedback resource determination program is executed by the processor, the processor is caused to perform steps in the sidelink feedback resource determination method described above.

According to a fourth aspect, there is provided a sidelink feedback resource determination device, including:
a determination module configured to obtain sidelink feedback resource configuration information, and determine a sidelink feedback resource set according to the sidelink feedback resource configuration information;
an obtaining module configured to obtain a first parameter set;
wherein the determination module is further configured to determine a sidelink feedback resource in the sidelink feedback resource set according to the first parameter set; and
a sending module configured to send sidelink feedback information to a second terminal on the sidelink feedback resource.

Figure 1:
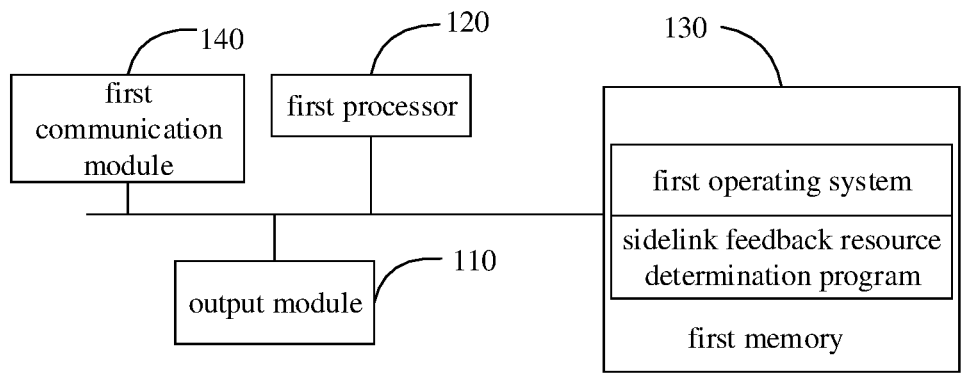
FIG. 1 is a schematic block diagram of a terminal according to an embodiment of the present disclosure.

The realization, functional characteristics and advantages of the present disclosure will be further described with reference to the accompanying drawings in conjunction with the embodiments.

DETAILED DESCRIPTION

It should be understood that the example embodiments described herein are only used to explain the present disclosure, but not to limit the present disclosure.

The main solutions provided by embodiments of the present disclosure are as follows. The first terminal obtains sidelink feedback resource configuration information, and determines a sidelink feedback resource set according to the sidelink feedback resource configuration information. The first terminal obtains a first parameter set. The first terminal determines a sidelink feedback resource in the sidelink feedback resource set according to the first parameter set. The first terminal sends sidelink feedback information to a second terminal on the sidelink feedback resource. In the solutions of the present disclosure, the first terminal determines the sidelink feedback resource in the sidelink feedback resource set according to the first parameter set, so that the first terminal sends the sidelink feedback information to the second terminal on the sidelink feedback resource. The technical solutions improve the reliability of the communication between the first terminal and the second terminal.

The main technical terms involved in embodiments of the present disclosure include:

- D2D (Device to Device): refers to the direct communication between terminal devices using Wi-Fi, Bluetooth, or LTE-D2D technologies.
- 3GPP (3rd Generation Partnership Project): The goal of 3GPP is to achieve a smooth transition from 2G network to 3G network, ensure backward compatibility of future technologies, support easy network construction and roaming and compatibility between systems. The functions of 3GPP is that 3GPP mainly formulates third-generation technical specifications based on the GSM core network with UTRA (FDD is W-CDMA technology, and TDD is TD-SCDMA technology) as the wireless interface.
- LTE-V2X (Long Term Evaluation-Vehicle to Everything): V2X (Vehicle to Everything) is a new generation of information and communication technology to connect vehicles with everything, so as to realize all-round connections and information exchanges, including Vehicle to Vehicle, vehicles to roadside infrastructure (Vehicle to Infrastructure), vehicles to pedestrians and other vulnerable traffic participants (Vehicle to Pedestrian), vehicles to cloud service platforms (Vehicle to Network).
- PRB (Physical Resource Block): refers to the resources of 12 consecutive carriers in the frequency domain, and the PRB corresponds to 12 consecutive carriers in the frequency domain (180K in the case of 15K carrier spacing).
- HARQ (Hybrid Automatic Repeat reQuest): is a technology formed by combining forward error correction coding (FEC) and automatic repeat request (ARQ).

The solutions of embodiments of the present disclosure are provided by considering the following issues in the related art. Terminals communicate with each other. Frequency domain resources for transmitting the sidelink feedback channel are configured in a feedback slot, or a transmission resource set for the sidelink feedback channel is configured. If a specific feedback resource cannot be determined in the set, the sidelink feedback information is lost or it is impossible to determine whether the terminal sends the sidelink feedback information, or multiple terminals transmit the feedback information through the same feedback resource, and thus the reliability of communications between the terminals is low.

In view of the above, an embodiment of the present disclosure proposes a solution as follows. The first terminal obtains sidelink feedback resource configuration information, and determines a sidelink feedback resource set according to the sidelink feedback resource configuration information. The first terminal obtains a first parameter set. The first terminal determines a sidelink feedback resource in the sidelink feedback resource set according to the first parameter set. The first terminal sends sidelink feedback information to a second terminal on the sidelink feedback resource. In the solutions of the present disclosure, the first terminal determines the sidelink feedback resource in the sidelink feedback resource set according to the first parameter set, the specific sidelink feedback resource for the first terminal is explicit, and thus the first terminal can send the sidelink feedback information to the second terminal on the sidelink feedback resource. The technical solutions improve the reliability of the communication between the first terminal and the second terminal.

Specifically, referring to FIG. 1, FIG. 1 is a schematic block diagram of a terminal according to an embodiment of the present disclosure. The terminal may be a device independent of a mobile terminal and capable of performing data processing, which may be carried on the mobile terminal in the form of hardware or software.

In an embodiment, the terminal at least includes an output module 110, a first processor 120, a first memory 130 and a first communication module 140.

The first memory 130 stores a first operating system and a sidelink feedback resource determination program. The terminal may obtain the sidelink feedback resource configuration information and store it in the first memory 130. The output module 110 may be a display screen, a speaker, etc. The display screen may display relevant interface information of the terminal. The first communication module 140 may include a WiFi module, a mobile communication module and a Bluetooth module, and the terminal may communicate with other terminals and a base station through the first communication module 140.

The following steps are carried out when the sidelink feedback resource determination program in the first memory 130 is executed by the processor:

- obtaining, by a first terminal, sidelink feedback resource configuration information, and determining a sidelink feedback resource set according to the sidelink feedback resource configuration information;
- obtaining, by the first terminal, a first parameter set;
- determining, by the first terminal, a sidelink feedback resource in the sidelink feedback resource set according to the first parameter set; and
- sending, by the first terminal, sidelink feedback information to a second terminal on the sidelink feedback resource.

In the technical solutions according to the above embodiment, the first terminal obtains sidelink feedback resource configuration information, and determines a sidelink feedback resource set according to the sidelink feedback resource configuration information. The first terminal obtains a first parameter set. The first terminal determines a sidelink feedback resource in the sidelink feedback resource set according to the first parameter set. The first terminal sends sidelink feedback information to a second terminal on the sidelink feedback resource. In the solutions of the present disclosure, the first terminal determines the sidelink feedback resource in the sidelink feedback resource set according to the first parameter set, the first terminal makes the specific sidelink feedback resource for the first terminal clear, and thus the first terminal can send the sidelink feedback information to the second terminal on the sidelink feedback resource. The technical solutions improve the reliability of the communication between the first terminal and the second terminal.

Based on the above device architecture, method embodiments of the present disclosure are proposed.

Figure 2:
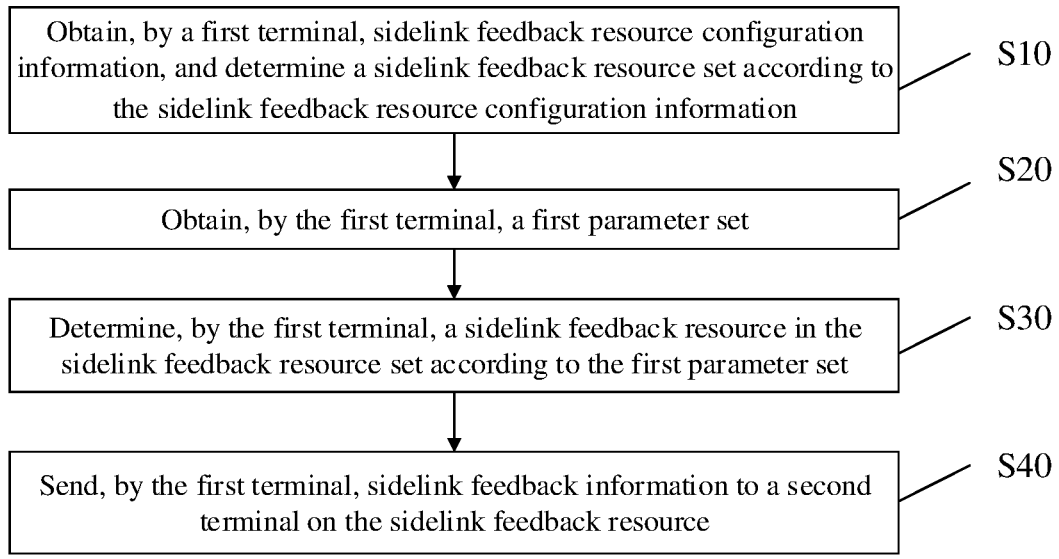
FIG. 2 is a schematic flowchart of a sidelink feedback resource determination method according to an embodiment of the present disclosure.

Referring to FIG. 2, FIG. 2 is a schematic flowchart of a sidelink feedback resource determination method according to an embodiment of the present disclosure. In this embodiment, the sidelink feedback resource determination method includes the following steps:

In step S10, the first terminal obtains sidelink feedback resource configuration information, and determines a sidelink feedback resource set according to the sidelink feedback resource configuration information.

The method in this embodiment is applied in a terminal, and method is performed by the first terminal, or, the method may be performed by a device for determining sidelink feedback resources carried on the terminal. The following description is made by taking an example where the method is performed by the terminal. In this embodiment, the first terminal may be a terminal such as a mobile phone, a tablet computer, or a vehicle device.

The sidelink feedback resource configuration information is used to configure a time domain resource and/or a frequency domain resource of the sidelink feedback resources. Specifically, the time domain resource of the sidelink feedback resource may include at least one of the following parameters: a time domain period of the sidelink feedback resources, and a time domain offset of the sidelink feedback resources. The time domain period N of the sidelink feedback resources is used to indicate that one sidelink feedback slot is included in N sidelink slots. The time domain offset of the sidelink feedback resources is used to indicate time domain offset information of the first sidelink feedback slot. The frequency domain resource of the sidelink feedback resources may include at least one of the following parameters: a frequency domain starting position of the sidelink feedback resources, a frequency domain end position of the sidelink feedback resources, the number of sidelink feedback resources, a frequency domain size occupied by one sidelink feedback resource, and the total frequency domain resource size of the sidelink feedback resources. The frequency domain starting position of the sidelink feedback resources is used to indicate a frequency domain starting position of a sidelink feedback resource with the lowest frequency domain position in a sidelink feedback resource set. The frequency domain end position of the sidelink feedback resources is used to indicate a frequency domain end position of a sidelink feedback resource with the highest frequency domain position in a sidelink feedback resource set. The number of sidelink feedback resources is used to indicate the number of configured sidelink feedback resources. The frequency domain size occupied by one sidelink feedback resource is used to indicate the frequency domain size of a Physical Sidelink Feedback Channel (PSFCH), for example, 1 PRB. The total frequency domain resource size of the sidelink feedback resources is used to indicate the size of the total frequency domain resources included in the sidelink feedback resource set.

The terminal obtains the configuration information of the sidelink feedback resource, and can determine a sidelink feedback resource set according to the configuration information. The set includes at least one sidelink feedback resource.

For example, the configuration information includes a frequency domain starting position and a frequency domain end position of the at least one sidelink feedback resource. The terminal can determine the frequency domain range of the sidelink feedback resource set. Further, according to the number of PRBs occupied by one sidelink feedback channel, the terminal can determine how many sidelink feedback resources are included in the sidelink feedback set and can determine the frequency domain position of each sidelink feedback resource.

In one embodiment, the network determines the frequency domain resource size of the configured sidelink feedback resources according to the number M of subbands included in a slot, the number of slots N included in a sidelink feedback resource period, and the number of PRBs occupied by a PSFCH. If each sidelink feedback channel PSFCH occupies 1 PRB, one slot includes M subbands, and one sidelink feedback resource period includes N slots, it is needed to configure M*N PRBs in the sidelink feedback slot and use the M*N PRBs in the sidelink feedback slot as the sidelink feedback resource set, in order to ensure that transmission resources for PSFCHs corresponding to PSSCHs (Physical Sidelink Shared Channels) with the same subband starting position in different slots may occupy different frequency domain resources, and that transmission resources for PSFCHs corresponding to PSSCHs with different subband starting positions in the same slot may occupy different frequency domain resources.

Further, if C PSFCH code division multiplexing (CDM) is supported on each PRB, and C is a positive integer greater than 1, the number of PRBs for the frequency domain resources configured by the network is (M*N/C).

In step S20, the first terminal obtains a first parameter set.

It is understandable that the first parameter set includes the following parameters: period information of the sidelink feedback resource, the number of subbands included in a slot, the starting position of the subband where the physical sidelink shared channel is located, the number of subbands occupied by the physical sidelink shared channel, a slot index of a slot where the physical sidelink shared channel is located, the number of members of a communication group where the first terminal belongs to, and/or the identity information of the first terminal.

In step S30, the first terminal determines a sidelink feedback resource in the sidelink feedback resource set according to the first parameter set.

It should be understood that the sidelink feedback resource set includes one or more sidelink feedback resources. In order to know which sidelink feedback resource in the sidelink feedback resource set should be used by the first terminal, the first terminal determines the sidelink feedback resource according to the first parameter set. If the first parameter set includes: period information of the sidelink feedback resource, the number of subbands included in a slot, the starting position of the subband where the physical sidelink shared channel is located and the slot index of the slot where the physical sidelink shared channel is located, the first terminal determines the sidelink feedback resource corresponding to the first terminal according to the period information of the sidelink feedback resource, the number of subbands included in a slot, the starting position of the subband where the physical sidelink shared channel is located, and the slot index of the slot where the physical sidelink shared channel is located. The determination includes determining sidelink feedback resources of different frequency domains and sidelink feedback resources of different code domains. That is, the determined sidelink feedback resources may be sidelink feedback resources of different frequency domains, or sidelink feedback resources of different code domains in the same frequency domain.

Figure 3:
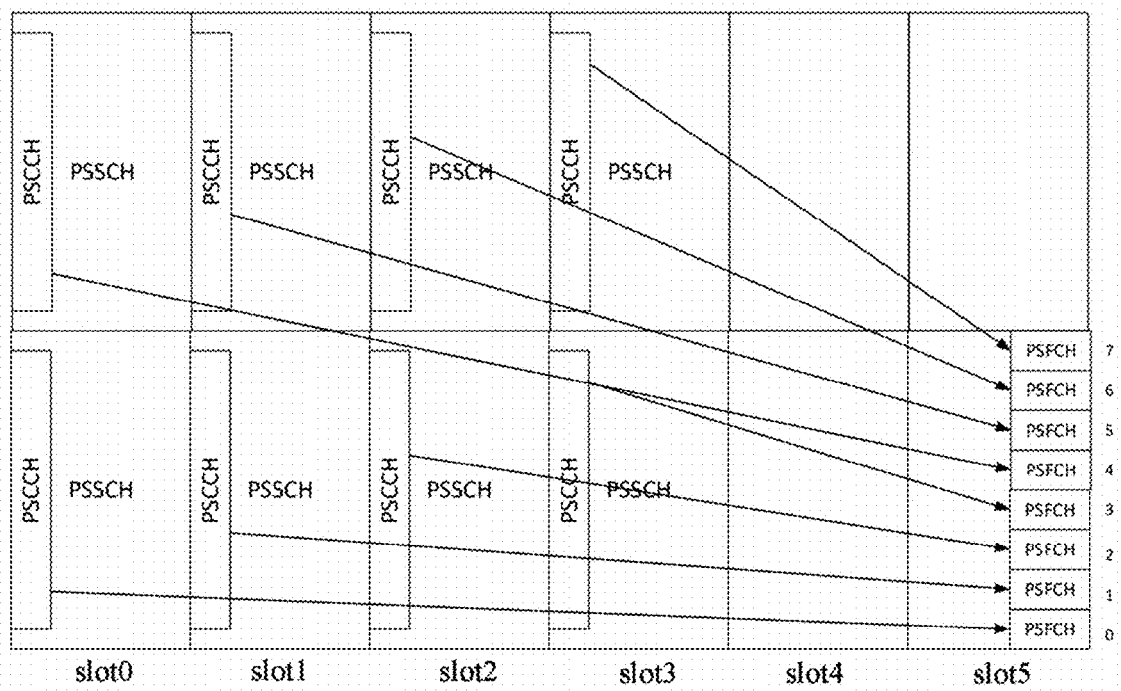
FIG. 3 is a first schematic block diagram showing determination of a sidelink feedback resource in a sidelink feedback resource determination method according to an embodiment of the present disclosure.

For example, as shown in FIG. 3, FIG. 3 is a first schematic block diagram showing determination of a sidelink feedback resource according to an embodiment. The resource pool includes 2 subbands, each subband includes 8 PRBs, and the period of the sidelink feedback channel is 4 slots, and 8 PRBs can be configured in the feedback slot for PSFCH transmission. The 8 PRBs in the feedback slot are shown as the PSFCHs with serial numbers 0-7 in slot 5, each PRB, that is, each PSFCH channel resource, respectively corresponds to the sidelink feedback resource of different slots and different subband starting positions. If the sending terminal uses a certain subband from slot 0 to slot 3 to transmit the PSSCH, the receiving terminal receives the PSSCH. According to the corresponding relationship between the PSFCHs and the PSSCHs in FIG. 3, the receiving terminal selects from the multiple PSFCH resources the PSFCH resource corresponding to the PSSCH.

In step S40, the first terminal sends sidelink feedback information to the second terminal on the sidelink feedback resource.

It should be noted that the first terminal sends sidelink feedback information to the second terminal on the sidelink feedback resource, and the second terminal may decide to send retransmission data or new data according to the received feedback information.

In embodiments of the present disclosure, the first terminal obtains sidelink feedback resource configuration information, and determines a sidelink feedback resource set according to the sidelink feedback resource configuration information. The first terminal obtains a first parameter set. The first terminal determines a sidelink feedback resource in the sidelink feedback resource set according to the first parameter set. The first terminal sends sidelink feedback information to a second terminal on the sidelink feedback resource. In the solutions of the present disclosure, the first terminal determines the sidelink feedback resource in the sidelink feedback resource set according to the first parameter set, the first terminal makes the specific sidelink feedback resource for the first terminal clear, and thus the first terminal can send the sidelink feedback information to the second terminal on the sidelink feedback resource. The technical solutions improve the reliability of the communication between the first terminal and the second terminal.

Figure 4:
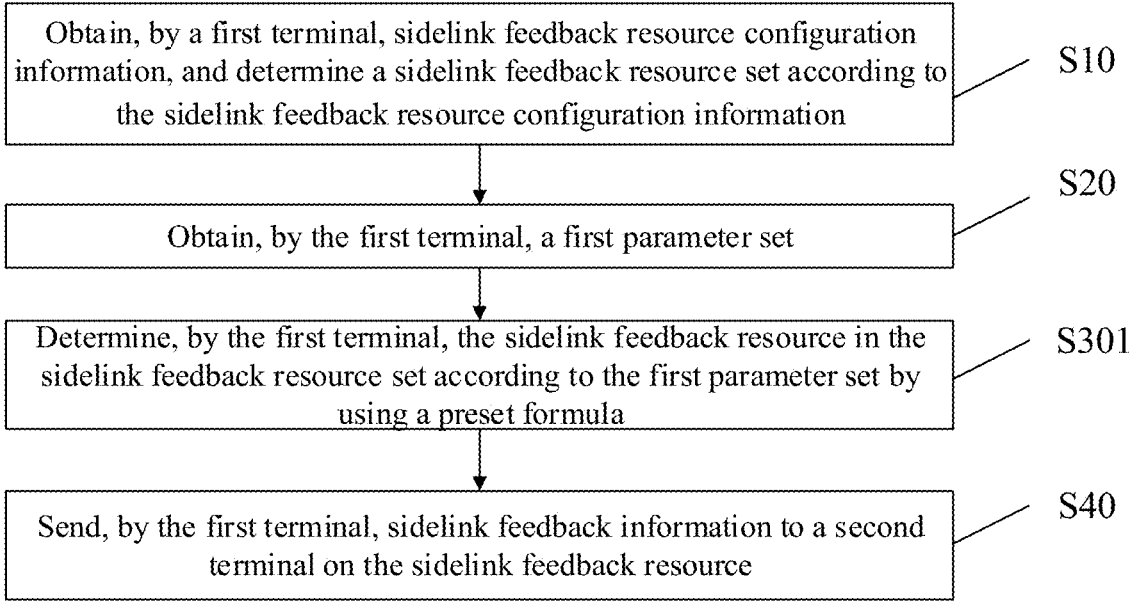
FIG. 4 is a schematic flowchart of a sidelink feedback resource determination method according to an embodiment of the present disclosure.

Referring to FIG. 4, FIG. 4 is a schematic flowchart of a sidelink feedback resource determination method according to an embodiment of the present disclosure. As shown in FIG. 4, based on the embodiment shown in FIG. 2, the foregoing step S30 of determining the sidelink feedback resource in the sidelink feedback resource set according to the first parameter set by the first terminal includes:

In step S301, the first terminal determines a sidelink feedback resource in the sidelink feedback resource set by using a preset formula according to the first parameter set.

It is understandable that, for unicast transmission, the receiving terminal is only one terminal. For groupcast transmission, the receiving terminals are all terminals in a communication group, or all terminals within a certain transmission distance.

For example, UE1, UE2, UE3 and UE4 constitute a communication group, in which UE1 sends data, and other terminal devices in the group are receiving terminals. For broadcast transmission, the receiving terminal is any terminal.

For example, UE1 is the sending terminal, the other terminals around UE1 are all receiving terminals. The first terminal may be the receiving terminal in the unicast transmission and the groupcast transmission. In the groupcast transmission, there may be multiple first terminals, and the first terminals may send sidelink feedback information through the same or different sidelink feedback resources in the sidelink feedback resource set. In order to enable the first terminals to send the sidelink feedback information through the sidelink feedback resources, and to avoid loss of the sidelink feedback information or to avoid that it is impossible to determine whether the terminals send the sidelink feedback information, the sidelink feedback resource for the first terminals can be determined by using a preset formula.

Further, the first parameter set includes: period information of sidelink feedback resources, the number of subbands included in a slot, the starting position of the subband where the physical sidelink shared channel is located, and the slot index of the slot where the physical sidelink shared channel is located.

In one embodiment, the preset formula includes a first formula, and the first formula is:

$$k = N * \left\lfloor \frac{m+1}{M} \right\rfloor + n;$$

where m=0, 1, 2, ..., M−1; n=0, 1, 2, ..., N−1; k=0, 1, 2, ..., K−1; m represents the starting position of the subband where the physical sidelink shared channel is located, n represents the slot index of the slot where the physical sidelink shared channel is located, k represents a sidelink feedback resource index; M represents the number of the subbands included in the slot, N represents the period information of the sidelink feedback resource, K represents the number of sidelink feedback resources included in the sidelink feedback resource set, and $\lfloor \ \rfloor$ represents a round-down operation.

It should be understood that the starting position of the subband where the PSSCH is located may be the subband index of the lowest subband of the subbands where the PSSCH is located. The number of subbands included in the one slot may be the number of subbands included in a resource pool. The maximum value of n is N−1, which means that the index is within a period of the sidelink feedback resources.

The step S301 of determining, by the first terminal, the sidelink feedback resource in the sidelink feedback resource set according to the first parameter set by using the preset formula includes:

calculating, by the first terminal, the sidelink feedback resource index by using the first formula according to the first parameter set, and determining a corresponding sidelink feedback resource in the sidelink feedback resource set according to the sidelink feedback resource index.

It should be understood that the transmission resource for the PSFCH is determined according to the slot where the PSSCH is located and the starting position of the subband. In the sidelink feedback resource set, the sidelink feedback resource indexes may be configured in order of PRBs from low to high.

For example, the sidelink feedback resource set includes K PRBs, which are indexed as 0, 1, 2, ..., K−1, from low to high.

The slot index of the slot where the physical sidelink shared channel is located may be a slot index within one sidelink feedback resource period. Optionally, the slot index of the slot where the physical side row shared channel is located may also be a slot or a slot index within one millisecond.

Determining the transmission resource for the PSFCH according to the slot where the PSSCH is located and the starting position of the subband includes calculating the sidelink feedback resource index by using the first formula. Continuing to refer to FIG. 3, M=2, N=4, the feedback resources corresponding to different subbands in different slots are shown in FIG. 3. According to the starting position of the subband where the physical sidelink shared channel is located, the slot index of the slot where the physical sidelink shared channel is located, the number of subbands included in the one slot, and the sidelink feedback resource period information, the sidelink feedback resource index is calculated by using the first formula, and accordingly the corresponding sidelink feedback resource is determined in the sidelink feedback resource set according to the sidelink feedback resource index.

It should be understood that, in the above embodiment, if one PSSCH spans multiple subbands, the corresponding sidelink feedback resources may be determined according to the starting position of each subband in the multiple subbands.

For example, if the PSSCH spans 4 subbands, then 4 sidelink feedback resources may be determined using the first formula according to the frequency domain starting position of each subband.

In yet another embodiment, the preset formula includes a second formula, and the second formula is:

$$k = M*n + m;$$

where m=0, 1, 2, ..., M−1; n=0, 1, 2, ..., N−1; k=0, 1, 2, ..., K−1; m represents the starting position of the subband where the physical sidelink shared channel is located, n represents the slot index of the slot where the physical sidelink shared channel is located, k represents a sidelink feedback resource index; M represents the number of the subbands included in the slot, N represents the period information of the sidelink feedback resource, and K represents the number of sidelink feedback resources included in the sidelink feedback resource set.

The determining, by the first terminal, the sidelink feedback resource in the sidelink feedback resource set according to the first parameter set by using the preset formula includes:
calculating, by the first terminal, the sidelink feedback resource index by using the second formula according to the first parameter set, and determining a corresponding sidelink feedback resource in the sidelink feedback resource set according to the sidelink feedback resource index.

Figure 5:
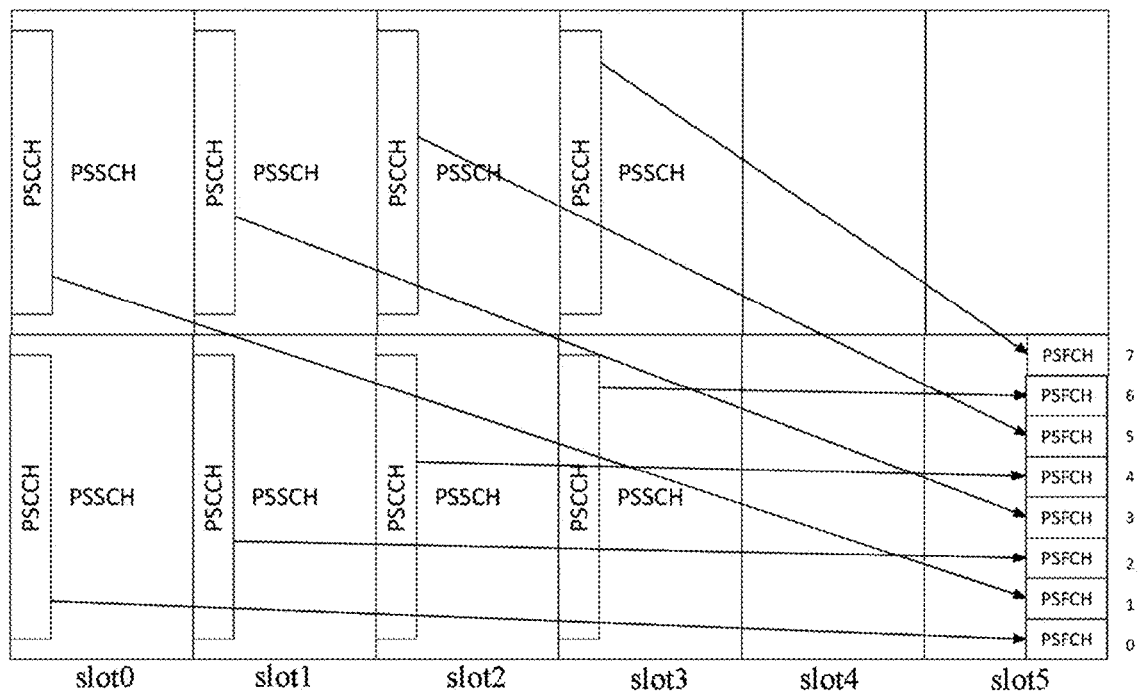
FIG. 5 is a second schematic block diagram showing determination of a sidelink feedback resource in a sidelink feedback resource determination method according to an embodiment of the present disclosure.

It should be noted that determining the transmission resource for the PSFCH according to the slot where the PSSCH is located and the starting position of the subband includes calculating the sidelink feedback resource index by using the second formula. An example is given for illustration. FIG. 5 is a second schematic block diagram showing determination of a sidelink feedback resource, M=2, N=4, and the feedback resources corresponding to different subbands in different slots are shown in FIG. 5. According to the starting position of the subband where the physical sidelink shared channel is located, the slot index of the slot where the physical sidelink shared channel is located, the number of subbands included in the one slot, and the sidelink feedback resource period information, the sidelink feedback resource index is calculated by the second formula, and accordingly the corresponding sidelink feedback resource is determined in the sidelink feedback resource set according to the sidelink feedback resource index.

In the two resource mapping modes calculated by the first formula and the second formula, the resource mapping mode calculated by the first formula is preferred. In this resource mapping mode, when a terminal transmits sidelink data by occupying two subbands, the corresponding sidelink feedback resources are spaced apart in the frequency domain, and are not adjacent. Thus, this is more beneficial to reduce the influence of in-band emission.

According to some embodiments, the method further includes:
obtaining information of a frequency domain size for one physical sidelink feedback channel.

Step S10 of obtaining, by the first terminal, the sidelink feedback resource configuration information, and determining the sidelink feedback resource set according to the sidelink feedback resource configuration information includes:
determining, by the first terminal, the sidelink feedback resource set according to the information of the frequency domain size for one physical sidelink feedback channel and the sidelink feedback resource configuration information;
each sidelink feedback resource in the sidelink feedback resource set has a different frequency domain resource.

It should be understood that information of the frequency domain size occupied by one physical sidelink feedback channel may be obtained. If information of the frequency domain size occupied by one physical sidelink feedback channel is 1 PRB, one slot includes M subbands, and one feedback resource period includes N slots, it is needed to configure M*N PRBs in the sidelink feedback slot and use the M*N PRBs in the sidelink feedback slot as the sidelink feedback resource set, in order to ensure that transmission resources for PSFCHs corresponding to PSSCHs with the same subband starting position in different slots may occupy different frequency domain resources, and that transmission resources for PSFCHs corresponding to PSSCHs with different subband starting positions in the same slot may occupy different frequency domain resources. In this way, individual feedback resources in the sidelink feedback resource set have different frequency domain resources.

In embodiments of the present disclosure, the first terminal determines the sidelink feedback resource in the sidelink feedback resource set by using a preset formula according to the first parameter set. In this way, the first terminal knows the specific sidelink feedback resource corresponding to the first terminal clearly. Different terminals send sidelink feedback information to the second terminal on their corresponding sidelink feedback resources, which improves the reliability of the communication between the first terminal and the second terminal.

Figure 6:
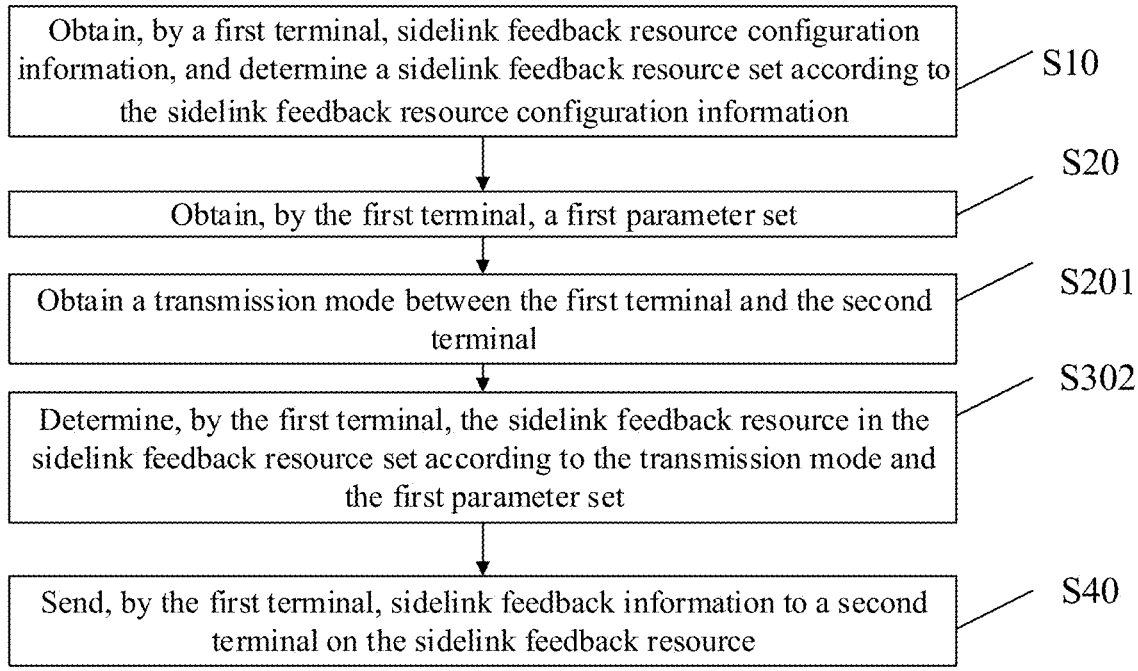
FIG. 6 is a schematic flowchart of a sidelink feedback resource determination method according to an embodiment of the present disclosure.

Referring to FIG. 6, FIG. 6 is a schematic flowchart of a sidelink feedback resource determination method according to an embodiment of the present disclosure. As shown in FIG. 6, based on the embodiment shown in FIG. 2, and the method further includes:

In step S201, the first terminal obtains a transmission mode between the first terminal and the second terminal.

FIG. 6 is illustrated by taking an example where step S201 is before step S30 in which the first terminal determines the sidelink feedback resource in the sidelink feedback resource set according to the first parameter set, but this does not mean that the actual execution sequence of S201, and the execution sequence of step 201 can be set according to actual needs, which is not limited in this embodiment.

It should be understood that the transmission mode between the first terminal and the second terminal includes the unicast transmission, a first feedback mode in a groupcast transmission mode, a second feedback mode in the groupcast transmission mode, and the broadcast transmission mode.

For example, for the unicast transmission, a sending terminal sends sidelink data to a receiving terminal. The sidelink data includes a Physical Sidelink Control Channel (PSCCH) and PSSCH. The receiving terminal sends HARQ feedback information to the sending terminal. The sending terminal determines whether retransmission is required according to the feedback information from the receiving terminal. The HARQ feedback information is carried in a sidelink feedback channel, such as PSFCH.

The sidelink feedback may be activated or deactivated through pre-configured information or network configuration information. If the sidelink feedback is activated, the receiving terminal receives the sidelink data sent by the sending terminal, and feeds back a HARQ positive acknowledgement (ACK) or negative acknowledgement (NACK) to the sending terminal according to a detection result. The sending terminal determines to send retransmission data or new data according to the feedback information from the receiving terminal. If the sidelink feedback is deactivated, the receiving terminal does not need to send feedback information, and the sending terminal usually adopts blind retransmission to send data.

For example, the sending terminal repeatedly sends each sidelink data R times, instead of determining whether to send retransmission data according to the feedback information from the receiving terminal.

In the groupcast transmission mode, two sidelink feedback modes are supported:

In the first feedback mode in the groupcast transmission mode: for terminals within a certain distance, if the detection result of the sidelink data sent by the sending terminal is NACK, the terminals need to send sidelink feedback, and if the detection result is ACK, the terminals do not need to send sidelink feedback. Terminals outside the distance range do not need to send sidelink feedback no matter what the detection result is. Optionally, all receiving terminals use the same sidelink feedback resources to send sidelink feedback information.

In the second feedback mode in the groupcast transmission mode: for a communication group, all receiving terminals need to send sidelink feedback.

For example, a communication group includes P terminals, and when one terminal acts as a sending terminal to send sidelink data, the other P−1 terminals all need to send sidelink feedback information. Optionally, different receiving terminals use different sidelink feedback resources to send sidelink feedback information.

In order to reduce the overhead of the PSFCH channel, one slot defined in every N slots includes PSFCH transmission resources, that is, the period of the sidelink feedback resources is N slots, and the parameter N is pre-configured or configured by the network.

Step S30 of determining the sidelink feedback resource in the sidelink feedback resource set according to the first parameter set by the first terminal includes:

In step S302, the first terminal determines the sidelink feedback resource in the sidelink feedback resource set according to the transmission mode and the first parameter set.

It should be noted that, for the unicast transmission or the first sidelink feedback in the groupcast transmission mode, only one corresponding sidelink feedback resource is required for one piece of sidelink data. If one sidelink data transmission occupies multiple subbands, one sidelink feedback resource is determined from the multiple sidelink feedback resources corresponding to the multiple subbands.

Further, step S302 of determining the sidelink feedback resource in the sidelink feedback resource set according to the transmission mode and the first parameter set by the first terminal includes:

In one embodiment, when the transmission mode is the unicast transmission or the first feedback mode in the groupcast transmission mode, and the number of subbands occupied by the physical sidelink shared channel is one, the first terminal determines a target sidelink feedback resource from the sidelink feedback resource set according to step S301.

In yet another embodiment, when the transmission mode is the unicast transmission or the first feedback mode in the groupcast transmission mode, and the number of subbands occupied by the physical sidelink shared channel is greater than one, the first terminal selects a preset number of target sidelink feedback resources from the multiple sidelink feedback resources in the sidelink feedback resource set according to a preset selection rule.

The multiple sidelink feedback resources are sidelink feedback resources which are respectively determined according to subband indexes of multiple subbands occupied by the physical sidelink shared channel.

It should be understood that, when the transmission mode is the unicast transmission or the first feedback mode in the groupcast transmission mode, only one corresponding sidelink feedback resource is required for one piece of sidelink data, and the preset number is one. However, since the number of subbands occupied by the physical sidelink shared channel is greater than one, the sidelink feedback resources determined according to the first formula or the second formula are also greater than one, and it is needed to select one sidelink feedback resource from the multiple sidelink feedback resources as the target sidelink feedback resource corresponding to the first terminal. The preset selection rule may be randomly selecting one sidelink feedback resource from multiple sidelink feedback resources as the target sidelink feedback resource corresponding to the first terminal, or may be selecting the first one of the last one of the multiple sidelink feedback resources as the target sidelink feedback resource corresponding to the first terminal.

Further, step S302 of determining the sidelink feedback resource in the sidelink feedback resource set according to the transmission mode and the first parameter set by the first terminal includes:

when the transmission mode is a second feedback mode in a groupcast transmission, obtaining, by the first terminal, the number of subbands occupied by the physical sidelink shared channel and identity information of the first terminal;

determining, by the first terminal, at least one corresponding sidelink feedback resource in the sidelink feedback resource set according to the number of the subbands occupied by the physical sidelink shared channel; and determining, by the first terminal, a corresponding target sidelink feedback resource in the at least one sidelink feedback resource according to the identity information.

It is understandable that when the transmission mode is the second feedback mode in the groupcast transmission mode, one piece of sidelink data requires multiple sidelink feedback resources. If the sidelink data occupies one subband, the subband corresponds to one sidelink feedback resource, and multiple first terminals code division multiplex on the sidelink feedback resource, or use different sequences to send the sidelink feedback information.

Specifically, multiple first terminals determine their respective feedback resources on the sidelink feedback resources corresponding to the subband according to their respective in-group identity numbers (IDs). The sidelink feedback resources for the multiple first terminals are code division multiplexed.

For example, when generating the feedback sequence, the first terminal generates the feedback sequence according to the information to be fed back and in-group ID. Different in-group IDs and different feedback information (ACK or NACK) correspond to different feedback sequences.

For another example, the first terminal determines a cyclic shift of the sequence according to the in-group ID, so that the sequences of different terminals are code division multiplexed.

Further, the method includes:

obtaining, by the first terminal, the number of members of a communication group where the first terminal belongs to; and grouping, by the first terminal, the members of the communication group according to the number of the members and the at least one sidelink feedback resource to obtain a grouping result;

determining, by the first terminal, the corresponding target sidelink feedback resource in the at least one sidelink feedback resource according to the identity information includes:

determining, by the first terminal, the corresponding target sidelink feedback resource in the at least one sidelink feedback resource according to the grouping result and the identity information.

It should be noted that, if the sidelink data occupies multiple subbands, the first sidelink feedback resource set is determined first. The sidelink feedback resources in the first sidelink feedback resource set are sidelink feedback resources corresponding to the subbands of the sidelink data. The plurality of first terminals are grouped according to the number of elements in the first sidelink feedback resource set, and each group corresponds to a sidelink feedback resource. On the sidelink feedback resources, feedback sequences are generated according to the sidelink feedback information and the in-group IDs of the first terminals, or the code domain resources are determined. The identity information of a first terminal is a in-group ID of the first terminal in the communication group where the first terminal belongs to.

For example, a communication group includes 10 terminals, among which one terminal (such as UE0) uses 2 subbands to send sidelink data in slot 0, and the remaining 9 terminals (such as UE1-UE9) send the sidelink feedback information. The corresponding in-group IDs of the terminals UE0 to UE9 in the communication group are ID0 to ID9, respectively. The sidelink feedback resources (index 0 and 4) corresponding to the two subbands occupied by the sidelink data constitute the first sidelink feedback resource set. The plurality of first terminals are grouped according to the number of feedback resources, and each group of first terminals corresponds to one sidelink feedback resource. The number A of sidelink feedback channels that each sidelink feedback resource needs to carry is calculated by using the following third formula:

$$A = \left\lceil \frac{P-1}{B} \right\rceil$$

where P represents the total number of terminals in the communication group; P−1 represents the total number of first terminals that need to send the sidelink feedback information; B represents the number of sidelink feedback resources with different frequency domain resources, or the number of elements in the sidelink feedback resource set; A represents the number of sidelink feedback channels that each sidelink feedback resource needs to carry, or the number of members of the first terminal group corresponding to each sidelink feedback resource; ⌈ ⌉ resents the round up operation.

In this example, P=10, B=2, A=5, UE0 (corresponding to ID0 in the group) is the sending terminal. The receiving terminals with the in-group IDs of ID1-ID5 send the sidelink feedback channel on the first sidelink feedback resource, that is, the sidelink feedback resource with an index of 0. First terminals with the in-group IDs of ID6-ID9 send the sidelink feedback information on the second sidelink feedback resource, that is, the sidelink feedback resource whose index is 4. On each sidelink feedback resource, the first terminals determine a code domain resource or generate a feedback sequence according to the sidelink feedback information which is to be fed back and the in-group IDs.

Further, the sending terminal determines the number of subbands of the sidelink data channels according to the number of receiving terminals in the group and the number of sidelink feedback channels that each sidelink feedback resource can carry. The sending terminal is the second terminal, and the receiving terminal is the first terminal. The total number D of subbands required by the sidelink data channel can be calculated by the following fourth formula:

$$D = \left\lceil \frac{P-1}{C} \right\rceil;$$

where P represents the total number of terminals in the communication group, P−1 represents the total number of receiving terminals that need to send feedback information, C represents the number of users or the number of sidelink feedback channels that a sidelink feedback resource can carry, and D represents the total number of subbands required for the sidelink data channel.

For example, one sidelink feedback resource occupies 1 PRB and can carry up to 12 different sequences. Considering that ACK or NACK are distinguished by different sequences, one sidelink feedback resource can multiplex the sidelink feedback information of 6 users, that is, C=6. There are 9 receiving terminals in a communication group, then according to the fourth formula, it can be determined that the sidelink data channel needs 2 subbands, that is, the second terminal needs 2 subbands to send sidelink data to each of the first terminals.

In this embodiment, the transmission mode between the first terminal and the second terminal is obtained, and the first terminal determines the sidelink feedback resource in the sidelink feedback resource set according to the transmission mode and the first parameter set. In this way, a unique sidelink feedback resource can be determined for each transmission mode, and the first terminal sends the sidelink feedback information to the second terminal on the sidelink feedback resource. The frequency domain resources for transmitting the sidelink feedback channel are configured in the feedback slot, or a sidelink feedback channel transmission resource set is configured, and specific feedback resources can be determined in the sidelink feedback channel transmission resource set. Especially, in the second feedback mode in the groupcast communication, multiple feedback terminals can obtain orthogonal feedback resources, which improves the reliability of communication between terminals.

An embodiment of the present disclosure further provides a terminal. The terminal includes a memory, a processor, and a sidelink feedback resource determination program stored on the memory and runnable on the processor. When the sidelink feedback resource determination program is executed by the processor, the processor is caused to perform steps in the sidelink feedback resource determination method described with reference to FIG. 1 to FIG. 6.

When the sideline feedback resource determination program stored in the terminal is executed by the processor, all the technical solutions of all the foregoing embodiments are carried out. Thus, at least all the beneficial effects brought by all the technical solutions of the foregoing embodiments can be realized by the terminal, and repeated descriptions will be omitted here.

An embodiment of the present disclosure further provides a computer-readable storage medium having a sidelink feedback resource determination program stored thereon. When the sidelink feedback resource determination program is executed by the processor, the processor is caused to perform steps in the sidelink feedback resource determination method described with reference to FIG. 1 to FIG. 6.

When the sideline feedback resource determination program stored in the computer-readable storage medium is executed by the processor, all the technical solutions of all the foregoing embodiments are carried out. Thus, at least all the beneficial effects brought by all the technical solutions of the foregoing embodiments can be realized by the terminal, and repeated descriptions will be omitted here.

Figure 7:
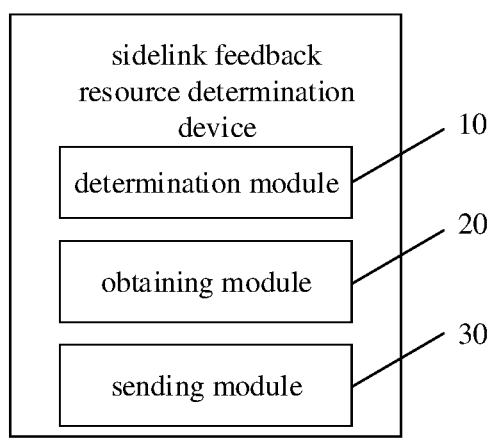
FIG. 7 is a schematic structural block diagram of a sidelink feedback resource determination device according to an embodiment of the present disclosure.

Referring to FIG. 7, an embodiment of the present disclosure further provides a sidelink feedback resource determination device. The device includes a determination module 10, an obtaining module 20 and a sending module 30.

The determination module 10 is configured to obtain sidelink feedback resource configuration information, and determine a sidelink feedback resource set according to the sidelink feedback resource configuration information.

The obtaining module 20 is configured to obtain a first parameter set.

The determination module 10 is further configured to determine a sidelink feedback resource in the sidelink feedback resource set according to the first parameter set.

The sending module 30 is configured to send sidelink feedback information to a second terminal on the sidelink feedback resource.

In an embodiment, the determination module 10 is further configured to:
determine the sidelink feedback resource in the sidelink feedback resource set according to the first parameter set by using a preset formula.

In an embodiment, the first parameter set includes: period information of the sidelink feedback resource, the number of subbands included in a slot, a starting position of a subband where a physical sidelink shared channel is located, and a slot index of a slot where the physical sidelink shared channel is located;
wherein the preset formula includes a first formula, and the first formula is:

$$k = N * \left\lfloor \frac{m+1}{M} \right\rfloor + n;$$

where m=0, 1, 2, ..., M−1; n=0, 1, 2, ..., N−1; k=0, 1, 2, ..., K−1; m represents the starting position of the subband where the physical sidelink shared channel is located, n represents the slot index of the slot where the physical sidelink shared channel is located, k represents a sidelink feedback resource index; M represents the number of the subbands included in the slot, N represents the period information of the sidelink feedback resource, K represents the number of sidelink feedback resources included in the sidelink feedback resource set, and $\lfloor \ \rfloor$ represents a round-down operation;
wherein the determination module 10 is further configured to:
calculate the sidelink feedback resource index by using the first formula according to the first parameter set, and determine a corresponding sidelink feedback resource in the sidelink feedback resource set according to the sidelink feedback resource index.

In an embodiment, the first parameter set includes: period information of the sidelink feedback resource, the number of subbands included in a slot, a starting position of a subband where a physical sidelink shared channel is located, and a slot index of a slot where the physical sidelink shared channel is located;
wherein the preset formula includes a second formula, and the second formula is:

$$k = M * n + m$$

where m=0, 1, 2, ..., M−1; n=0, 1, 2, ..., N−1; k=0, 1, 2, ..., K−1; m represents the starting position of the subband where the physical sidelink shared channel is located, n represents the slot index of the slot where the physical sidelink shared channel is located, k represents a sidelink feedback resource index; M represents the number of the subbands included in the slot, N represents the period information of the sidelink feedback resource, and K represents the number of sidelink feedback resources included in the sidelink feedback resource set;
wherein the determination module 10 is further configured to:
calculate the sidelink feedback resource index by using the second formula according to the first parameter set, and determine a corresponding sidelink feedback resource in the sidelink feedback resource set according to the sidelink feedback resource index.

In an embodiment, the obtaining module 20 is further configured to:

obtain information of a frequency domain size for one physical sidelink feedback channel;

wherein the determination module 10 is further configured to:

determine the sidelink feedback resource set according to the information of the frequency domain size for one physical sidelink feedback channel and the sidelink feedback resource configuration information;

wherein each sidelink feedback resource in the sidelink feedback resource set has a different frequency domain resource.

In an embodiment, the obtaining module 20 is further configured to:

obtain a transmission mode between the first terminal and the second terminal;

wherein the determination module 10 is further configured to:

determine the sidelink feedback resource in the sidelink feedback resource set according to the transmission mode and the first parameter set.

In an embodiment, the determination module 10 is further configured to:

when the transmission mode is a unicast transmission or a first feedback mode in a groupcast transmission, and the number of subbands occupied by the physical sidelink shared channel is greater than one, select a preset number of target sidelink feedback resources from a plurality of sidelink feedback resources in the sidelink feedback resource set according to a preset selection rule;

wherein the plurality of sidelink feedback resources are sidelink feedback resources which are respectively determined according to subband indexes of a plurality of subbands occupied by the physical sidelink shared channel.

In an embodiment, the determination module 10 is further configured to:

when the transmission mode is a second feedback mode in a groupcast transmission, obtain the number of subbands occupied by the physical sidelink shared channel and identity information of the first terminal;

wherein the determination module 10 is further configured to determine at least one corresponding sidelink feedback resource in the sidelink feedback resource set according to the number of the subbands occupied by the physical sidelink shared channel; and wherein the determination module 10 is further configured to determine a corresponding target sidelink feedback resource in the at least one sidelink feedback resource according to the identity information.

In an embodiment, the obtaining module 20 is further configured to:

obtain the number of members of a communication group where the first terminal belongs to; and wherein the device further includes a grouping module configured to group the members of the communication group according to the number of the members and the at least one sidelink feedback resource to obtain a grouping result;

wherein the determination module is configured to:

determine the corresponding target sidelink feedback resource in the at least one sidelink feedback resource according to the grouping result and the identity information.

For the specific implementations of the sideline feedback resource determination device according to embodiments of the present disclosure, reference may be made to the foregoing method embodiments, and details are not described herein again.

As compared with related arts, the first terminal obtains sidelink feedback resource configuration information, and determines a sidelink feedback resource set according to the sidelink feedback resource configuration information. The first terminal obtains a first parameter set. The first terminal determines a sidelink feedback resource in the sidelink feedback resource set according to the first parameter set. The first terminal sends sidelink feedback information to a second terminal on the sidelink feedback resource. In the solutions of the present disclosure, the first terminal determines the sidelink feedback resource in the sidelink feedback resource set according to the first parameter set, the first terminal makes the specific sidelink feedback resource for the first terminal clear, and thus the first terminal can send the sidelink feedback information to the second terminal on the sidelink feedback resource. The technical solutions improve the reliability of the communication between the first terminal and the second terminal.

It should be noted that the terms "comprising", "including" or any other variation thereof are intended to mean non-exclusive inclusion, such that a process, a method, article or a system including a series of elements includes not only those elements, it also includes other elements not expressly listed or inherent to such process, method, article or system. Without further limitation, an element defined by the phrase "including a . . . " does not preclude the presence of additional identical elements in the process, method, article or system that includes the element.

The above-mentioned serial numbers in embodiments of the present disclosure are only for description, and do not represent the advantages or disadvantages of the embodiments.

From the description of the above embodiments, those skilled in the art can clearly understand that the methods of the above embodiments can be implemented by means of software plus a necessary general hardware platform, and of course hardware can also be used, but in many cases the former is better implementation. Based on this understanding, the essence or the parts that contribute to the prior art in technical solutions of the present disclosure can be embodied in the form of software product. The computer software product is stored in the above storage medium (such as ROM/RAM, magnetic disk, optical disk), including several instructions to make a terminal device (which may be a mobile phone, a computer, a server, a controlled terminal, or a network device, etc.) to perform the method of each embodiment of the present disclosure.

The above are only example embodiments of the present disclosure, and are not intended to limit the scope of the present disclosure. Any equivalent structure or equivalent process modifications made by using the contents of the description and drawings of the present disclosure, or direct or indirect usage in other related technical fields, all fall within the scope of the present disclosure.

What is claimed is:

1. A sidelink feedback resource determination method, comprising:

obtaining, by a first terminal, sidelink feedback resource configuration information, and determining a sidelink feedback resource set according to the sidelink feedback resource configuration information;

obtaining, by the first terminal, a first parameter set;

determining, by the first terminal, a sidelink feedback resource in the sidelink feedback resource set according to the first parameter set; and sending, by the first terminal, sidelink feedback information to a second terminal on the sidelink feedback resource;

wherein determining, by the first terminal, the sidelink feedback resource in the sidelink feedback resource set according to the first parameter set comprises:

determining, by the first terminal, the sidelink feedback resource in the sidelink feedback resource set according to the first parameter set by using a preset formula;

wherein the first parameter set comprises: period information of the sidelink feedback resource, the number of subbands comprised in a slot, a starting position of a subband where a physical sidelink shared channel is located, and a slot index of a slot where the physical sidelink shared channel is located;

wherein the slot index of the slot where the physical sidelink shared channel is located is a slot index in one sidelink feedback resource period.

2. The sidelink feedback resource determination method according to claim 1, further comprising:

obtaining information of a frequency domain size for one physical sidelink feedback channel;

wherein obtaining, by the first terminal, the sidelink feedback resource configuration information, and determining the sidelink feedback resource set according to the sidelink feedback resource configuration information comprises:

determining, by the first terminal, the sidelink feedback resource set according to the information of the frequency domain size for one physical sidelink feedback channel and the sidelink feedback resource configuration information;

wherein each sidelink feedback resource in the sidelink feedback resource set has a different frequency domain resource.

3. The sidelink feedback resource determination method according to claim 1, further comprising:

obtaining a transmission mode between the first terminal and the second terminal;

wherein determining, by the first terminal, the sidelink feedback resource in the sidelink feedback resource set according to the first parameter set comprises:

determining, by the first terminal, the sidelink feedback resource in the sidelink feedback resource set according to the transmission mode and the first parameter set.

4. The sidelink feedback resource determination method according to claim 3, wherein determining, by the first terminal, the sidelink feedback resource in the sidelink feedback resource set according to the transmission mode and the first parameter set comprises:

when the transmission mode is a second feedback mode in a groupcast transmission, obtaining, by the first terminal, the number of subbands occupied by the physical sidelink shared channel and identity information of the first terminal;

determining, by the first terminal, at least one corresponding sidelink feedback resource in the sidelink feedback resource set according to the number of the subbands occupied by the physical sidelink shared channel; and determining, by the first terminal, a corresponding target sidelink feedback resource in the at least one sidelink feedback resource according to the identity information.

5. The sidelink feedback resource determination method according to claim 4, wherein the identity information of the first terminal is an in-group identity of the first terminal in a communication group where the first terminal belongs to.

6. A terminal device, comprising one or more processors, and memory storing a plurality of programs that, when executed by the one or more processors, cause the terminal device to:

obtain sidelink feedback resource configuration information, and determine a sidelink feedback resource set according to the sidelink feedback resource configuration information;

obtain a first parameter set;

determine a sidelink feedback resource in the sidelink feedback resource set according to the first parameter set; and send sidelink feedback information to a second terminal on the sidelink feedback resource;

wherein when the plurality of programs are executed by the one or more processors, the terminal device is caused to:

determine the sidelink feedback resource in the sidelink feedback resource set according to the first parameter set by using a preset formula;

wherein the first parameter set comprises: period information of the sidelink feedback resource, the number of subbands comprised in a slot, a starting position of a subband where a physical sidelink shared channel is located, and a slot index of a slot where the physical sidelink shared channel is located;

wherein the slot index of the slot where the physical sidelink shared channel is located is a slot index in one sidelink feedback resource period.

7. The terminal device according to claim 6, wherein when the plurality of programs are executed by the one or more processors, the terminal device is caused to:

obtain information of a frequency domain size for one physical sidelink feedback channel; and determine the sidelink feedback resource set according to the information of the frequency domain size for one physical sidelink feedback channel and the sidelink feedback resource configuration information;

wherein each sidelink feedback resource in the sidelink feedback resource set has a different frequency domain resource.

8. The terminal device according to claim 6, wherein when the plurality of programs are executed by the one or more processors, the terminal device is caused to:

obtain a transmission mode between the first terminal and the second terminal; and determine the sidelink feedback resource in the sidelink feedback resource set according to the transmission mode and the first parameter set.

9. The terminal device according to claim 8, wherein when the plurality of programs are executed by the one or more processors, the terminal device is caused to:

when the transmission mode is a second feedback mode in a groupcast transmission, obtain the number of subbands occupied by the physical sidelink shared channel and identity information of the first terminal;

determine at least one corresponding sidelink feedback resource in the sidelink feedback resource set according to the number of the subbands occupied by the physical sidelink shared channel; and determine a corresponding target sidelink feedback resource in the at least one sidelink feedback resource according to the identity information.

* * * * *